United States Patent

Collins

[11] Patent Number: 6,151,875
[45] Date of Patent: Nov. 28, 2000

[54] GRASS CATCHER INSERT FOR LAWN MOWER

[76] Inventor: Titus Collins, 1907 N. Natoma, Chicago, Ill. 60635

[21] Appl. No.: 09/056,886

[22] Filed: Apr. 9, 1998

[51] Int. Cl.⁷ ................................................. A01D 34/00
[52] U.S. Cl. .............................................. 56/202; 56/199
[58] Field of Search .................. 56/202, 199; 383/120, 383/123, 33, 906, 907

[56] References Cited

U.S. PATENT DOCUMENTS

| | | | |
|---|---|---|---|
| 2,973,614 | 10/1961 | Horner et al. | 56/202 |
| 3,321,893 | 5/1967 | Leader | 56/202 |
| 3,492,800 | 2/1970 | Peterson et al. | 56/202 |
| 3,611,685 | 10/1971 | Allina | 56/202 |
| 3,618,157 | 11/1971 | Bassin | 56/202 |
| 3,738,091 | 6/1973 | Fesco | 55/367 |
| 3,874,152 | 4/1975 | Dahl . | |
| 4,030,273 | 6/1977 | Leader | 56/202 |
| 4,251,982 | 2/1981 | Skaja et al. | 56/202 |
| 4,377,063 | 3/1983 | Leaphart . | |
| 4,566,257 | 1/1986 | Akrabawi . | |
| 4,907,403 | 3/1990 | Jones | 56/202 |
| 4,989,400 | 2/1991 | Wark . | |
| 5,003,758 | 4/1991 | Bernstein . | |
| 5,042,241 | 8/1991 | Boylston et al. | 56/202 |
| 5,179,824 | 1/1993 | Ridge et al. . | |
| 5,243,809 | 9/1993 | Redding . | |
| 5,365,727 | 11/1994 | Cross . | |
| 5,564,265 | 10/1996 | Pitt . | |

*Primary Examiner*—David Bagnell
*Assistant Examiner*—Meredith C. Petravick
*Attorney, Agent, or Firm*—Patula & Associates

[57] ABSTRACT

A debris catching insert configured to be placed in a debris catching bag which is adapted to be removably attached to a debris discharging device, the debris catching insert comprising a first side and a second side connected to the first side by a top and a bottom, wherein at least one of the first side, second side, top and bottom comprise an air permeable panel.

5 Claims, 3 Drawing Sheets

GRASS CATCHER INSERT FOR LAWN MOWER

BACKGROUND OF THE INVENTION

1. Field of the Invention

The present invention relates generally to an insert which may be employed in a grass catching bag of any typical lawn mower for simplified removal of grass clippings from the grass catching bag.

The present invention provides an insert sized to allow insertion into any typical sized grass catching bag such that removal of the insert effectuates removal of clippings deposited in the grass catching bag. Thus, the insert may simply be removed from the associated grass catcher and placed in a government pre-approved area for biodegradable refuse. Furthermore, the inserts are constructed from government pre-approved materials so that no transfer of the clippings from the insert is ever required.

2. Description of the Related Art

Lawn mowing devices have long been used to cut grass or other vegetation which may grow on a parcel of land. A mowing device of this nature typically comprises a discharge chute out of which clippings cut by the mowing device are thrown. Typically the mowing device comprises a blade or other means which produces a high pressure area within the mowing device such that the projection of the clippings created thereby is assisted by a flow of air from the high pressure area within the mowing device, through the discharge chute and into the ambient air pressure outside of the mowing device.

A mowing device may usually be purchased with a catching bag for attachment to the discharge chute of the mowing device for collection of the clippings discharged therefrom. The catching bag is left on the mowing device until said bag is full of clippings. The bag is then emptied and replaced onto the mowing device to allow for further mowing. Depending upon the size of the land to be mowed, the bag may need to be emptied many times during a single mowing.

The catching bag is usually emptied by detaching said bag from the mowing device and allowing the clippings to fall from a mouth thereon into a disposal device. Problems arise with emptying such bags because the clippings become tightly bound together such that they do not easily fall from the catching bag. Consequently, manual pulling of the clippings from the catching bag is often required. Whether or not the clipping fall easily from the catching bag, removal of said clippings is time consuming and often presents medical problems for persons who are allergic to certain vegetation which grows on the land being mowed.

Additionally, environmental concerns in society and government have lead to the recent enactment of legislation and regulations requiring a particular method of handling certain types of debris, including organic materials such as lawn clippings. A typical requirement for handling such debris is placement of said debris in specified bags for collection by the local government. A typical specified bag is a two-ply paper bag constructed of strong, but easily biodegradable paper.

Prior attempts at providing a system which eliminates the handling of clippings comprise complicated systems which often limit their use to a single size and make of lawn mower. Additionally, the cost of producing and mounting these prior systems onto pre-existing mowers having only a typical grass catching bag is prohibitive thereby leaving persons already owning mowing devices devoid of an opportunity to dispose of lawn clippings without the handling thereof. Consequently, many persons who use a mowing device on their lawn are required to empty clippings from a mower bag into collection bags specified by a governmental entity.

U.S. Pat. No. 5,564,265 issued to Pitt discloses an attempt at a grass catcher. Pitt teaches an insert bag to be placed in a grass catcher. However, the insert bag of Pitt requires an adapter frame designed for attachment to the particular lawn mower with which the insert bag is intended to be used. Therefore, the bag of Pitt is not adaptable to varying sizes and makes of lawn mowers. Additionally, the insert bag of Pitt fails to take into consideration today's environmental needs and the laws enacted to protect the same.

U.S. Pat. No. 4,377,063 issued to Leaphart discloses another attempt at a grass catcher. Leaphart teaches a catcher bag for use with an elaborate catcher housing. Furthermore, the catcher bag of Leaphart requires a special lip or other type of adapter to allow for attachment of said catcher bag to the intended mower. Additionally, the insert bag of Leaphart fails to take into consideration today's environmental needs and the laws enacted to protect the same.

U.S. Pat. No. 3,874,152 issued to Dahl discloses another attempt at a grass catcher. Dahl teaches a collection bag requiring a carrier sack having a collar assembly to which the collection bag must be affixed. Furthermore, the insert bag of Dahl fails to provide for today's environmental need and the laws enacted to protect the same.

U.S. Pat. No. 4,566,257 issued to Akrabawi discloses another attempt at a grass catcher. Akrabawi teaches an elaborate mounting system for a grass catcher insert comprising a plate and a safety container. The plate of Akrabawi prevents said mounting system from being adaptable to varying sizes and makes of lawn mowers. Again, today's environmental needs and laws are not taken into consideration by Akrabawi.

U.S. Pat. No. 4,989,400 issued to Wark discloses another attempt at a grass catcher. Wark teaches an apparatus comprising a cradle assembly to support the grass catcher and a connector assembly to mount the grass catcher to a lawn mower. The complicated apparatus of Wark presents too great a cost for conversion of older lawn mowers. Furthermore, today's environmental needs and laws are not taken into consideration by Wark.

U.S. Pat. No. 5,003,758 issued to Bernstein discloses an attempt at a debris catcher. Bernstein teaches an expandable plastic bag comprising two securement means to allow attachment of the plastic bag to a debris discharging machine and various porous panels located in the plastic bag. The costs of producing and using the bag of Bernstein would be prohibitive.

U.S. Pat. No. 5,179,824 issued to Ridge et al. discloses another attempt at a grass catcher. Ridge et al. teaches a system comprising a grass catching bag requiring an adapter for connection to an intended lawn mower and a support holding the bag off the ground. The complicated system of Ridge et al. prevents adaptability to varying sizes and makes of lawn mowers and dictates a prohibitive cost of implementing the system. Additionally, today's environmental needs and laws are not taken into consideration by Ridge et al.

U.S. Pat. No. 5,243,809 issued to Redding discloses another attempt at a debris catching bag. Redding teaches a debris catching bag which is configured of an elaborate shape and construction and which requires a special sealing means and a housing for the catching bag. The complicated nature of the system of Redding raises production costs of the bags and the costs of adapting to this system to a prohibitive level. Furthermore, today's environmental needs and laws are not taken into consideration by Redding.

U.S. Pat. No. 5,365,727 issued to Cross discloses another attempt at a grass catcher. Cross teaches a system for catching grass comprising a bag, an adapter and a mounting frame. The adapter of Cross must be removed from each bag used in the mounting frame prior to disposal. The costs required to convert to or employ the system of Cross is prohibitive. Additionally, the need of today's environment and the laws related thereto are not taken into consideration by the bag of Cross. Furthermore, excess handling of the grass catching bag presents health problems to those persons having allergies.

It is therefore an object of the present invention to provide an insert for a grass catching bag which gathers grass clippings therein for easy removal.

It is a further object of the present invention to provide an insert for a grass catching bag which may be adapted to fit any typical grass catching bag.

It is a further object of the present invention to provide an insert for a grass catching bag which may be adapted to fit any typical lawn mower.

It is a further object of the present invention to provide an insert for a grass catching bag which does not require expensive or cumbersome hardware to allow use with an intended lawn mower.

It is a further object of the present invention to provide an insert for a grass catching bag which does not require manual removal of the grass clippings therefrom.

It is a further object of the present invention to provide an insert for a grass catching bag which eliminates the need for a user to physically contact the grass clippings.

It is a further object of the present invention to provide an insert for a grass catching bag which meets governmental requirements for disposal of biodegradable or organic matter.

SUMMARY OF THE INVENTION

The above and other objects of the present invention are accomplished by providing an insert for a grass catcher bag of any typical lawn mower. The insert of the present invention comprises a mouth, an opposing closed end and a length therebetween. The insert further comprises a width and a depth which extends substantially along a length of the insert. The width and depth are configured to allow the insert to slid in and out of a typical grass catching bag of a lawn mower.

The insert of the present invention is constructed to be longer than all known grass catching bags such that a portion of the insert will extend beyond the mouth of the insert when said insert is fully inserted into the grass catching bag. The grass catching bag is then placed adjacent to a discharge chute of the associated lawn mower and small tears are made in the insert where necessary to circumvent hardware designed to allow attachment of the grass catching bag to the discharge chute. The mouth of the insert is then placed around the discharge chute and the mouth of the grass catching bag is slid over the discharge chute and secured thereto by the hardware intended therefore. The placement of the grass catching bag over the insert acts to clamp and hold the insert between the grass catching bag and the discharge chute until said grass catching bag is removed from said discharge chute.

To allow proper flow of grass clippings from the discharge chute, air flow from said discharge chute must be maintained. Therefore, typical grass catching bags comprise air permeable panels at the sides thereof. In this manner air flowing from the discharge chute will carry clippings into the grass catching bag and exit the grass catching bag through the air permeable panels leaving the grass clippings inside the grass catching bag. In order to allow the proper air flow from the discharge chute into the insert, said insert is also provided with at least one air permeable panel thereon. Preferably, the air permeable panels are provided by a plurality of perforations in the insert. To accommodate the typical grass catching bag, the present insert preferably locates the plurality of perforations at the sides of the insert to allow air flow from the air permeable panels of the insert to the air permeable panels of the grass catching bag.

The insert is preferably constructed from a two-ply paper. The two-ply paper meets standard governmental regulations for disposal of organic or biodegradable material. Furthermore, because paper is substantially un-stretchable, the width and depth of the insert will not be expanded by the forcing of grass clippings into the insert during use of the lawn mower. Consequently, the width and depth of the insert will be sustained and allow for substantially easy removal of the insert from the grass catching bag after the insert has been filled with grass clippings. This allows for quick, easy and clean removal of the grass clippings from the grass catching bag. A person using the present insert need not spend time shaking the grass catching bag or pulling grass clippings from the grass catching bag as required by prior grass catching devices. Rather, the insert is simply removed from the grass catching bag and placed in a governmental approved location for disposal. Because the insert is constructed of approved material for organic or biodegradable waste, the grass clippings need not be transferred to another container for disposal.

In a preferred embodiment, the insert comprises at least one fold extending from the mouth thereof along a portion of the length of the insert. The folds allow the mouth of the insert to be opened to a larger width and depth when required for a mower comprising a discharge chute which is larger than the typical discharge chute. A variety of closure devices, such as a draw string, are also contemplated to allow for easy closure of the insert after removal of said insert from the grass catching bag.

The present insert therefore provides a one size fits all insert for grass catching bags and lawn mowers of all makes and sizes. Consequently, one owning any typical lawn mower need only buy the present insert and apply the insert as described above to achieve the benefits of the present invention. Upon the grass clippings reaching the capacity of the insert, the user may slide the insert from the grass catching bag and place said insert in the governmental approved location for disposal. No contact with the grass clippings, or secondary container for the grass clippings is required. Time, effort and money are all thereby saved.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein.

DETAILED DESCRIPTION OF THE PREFERRED EMBODIMENT

Figure 1:
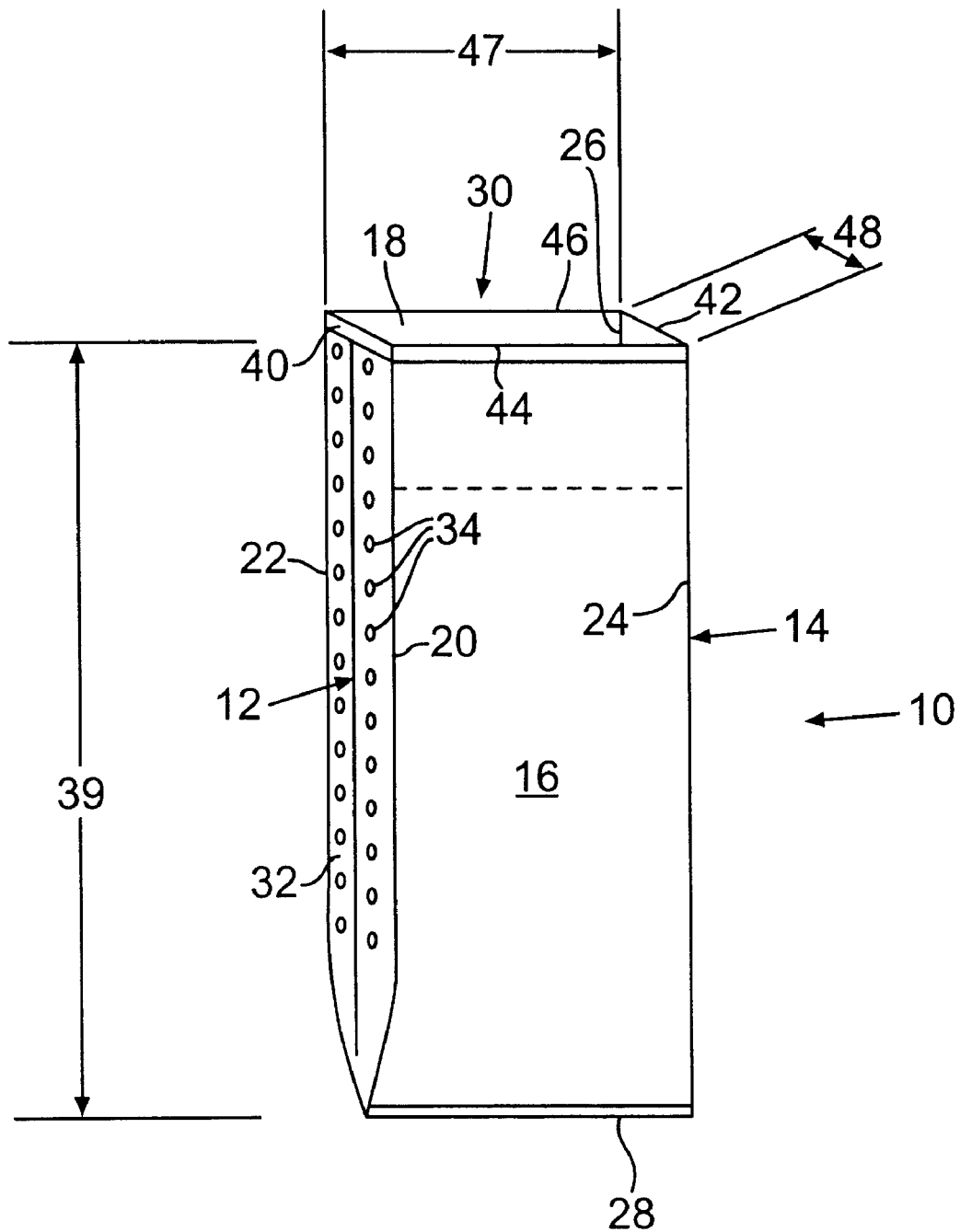
FIG. 1 depicts a substantially schematic perspective view of one embodiment of the insert of the present invention.

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

An insert 10 of the present invention is depicted generally in FIG. 1. The insert 10 comprises a first side 12 and an opposing second side 14. The insert 10 further comprises a top 16 and a bottom 18. The first side 12 connects a first edge 20 of said top to a first edge 22 of said bottom. Likewise, said second side 14 connects a second edge 24 of said top to a second edge 26 of said bottom. The top 16 and the bottom 18 are sealed one to the other at a closed end 28 of the insert 10. The top 16 and bottom 18 are left unattached at an opposing open end 30 of the insert 10. This general construction forms a bag-like container into which debris may be deposited at the open end 28 and retained due to the closed construction of the remainder of the insert 10.

Each of the first and second sides 12,14 of the insert 10 are configured as a panel 32, at least a portion of which is constructed to be air permeable. Preferably, the air permeability is provided by a plurality of perforations 34 in said first and second sides 12,14 to allow passage of air therethrough. The perforations should be sized to allow passage of air therethrough yet prevent passage of clippings from a lawn. The travel of clippings from a discharge chute 36 of an associated lawn mower into the insert 10 depends at least in part upon an air current created which travels from the discharge chute 36 into the insert. In order to assure that the clippings properly travel into the insert 10, the plurality of perforations 34 should permit passage of enough air to allow the air current to flow into and out of the insert 10 when said insert 10 is placed on a lawn mower consistent with the present invention. A majority of lawn mowers which comprise a grass catching bag 37 have air permeable panels 38 located at the sides thereof as opposed to the top and bottom. The plurality of perforations 34 are therefore preferably placed at the first and second sides 12,14 of the insert 10 which will substantially align with the air permeable panels 38 of the typical grass catching bag 37 in order to allow optimum air flow with the majority of lawn mower grass catching bags. In this manner, the advantages of the insert 10 of the present invention may be enjoyed with a majority of existing lawn mower grass catching bags 37. It should be noted, however, that other configurations or positions of perforations are contemplated and do not depart from the scope of the present invention.

The first edges 20,22 of the top 16 and the bottom 18 as well as the second edges 24,26 of the top 16 and the bottom 18 comprise a length 39 of said insert 10. The insert open end 30 is defined by an open edge 40 of said first side 12, and open edge 42 of said second side 14, an open edge 44 of said top and an open edge 46 of said bottom. The open edges 44,46 of the top 16 and the bottom 18, respectively, define a width 47 of said insert. The top 16 and bottom 18 of said insert substantially maintain said width 47 from the open edge 44,46 thereof to the closed end 28 of said insert 10. Furthermore, the open edges 40,42 of said first side and said second side comprise a depth 48 of said insert open end 30 which is not substantially exceeded over the entirety of the insert 10. Each of said first and second sides 12,14 preferably comprise a break line extending substantially along the length 39 thereof to facilitate displacement of the first and second sides 12,14 inward between said top 16 and said bottom 18. Displacing said first and second sides 12,14 in this manner will bring the top 16 toward the bottom 18 to accomplish breaking down of the insert for storage or shipping.

Preferably, the insert 10 is constructed of a two-ply paper. Two-ply paper has been found to be strong such that it may hold the heavy materials therein as well as resist puncture of the insert 10 by rocks or other hard objects propelled at the insert 10 by the mower. Furthermore, a large number of local governments have enacted legislation and/or regulations requiring the use of certain specified types of containers to dispose of organic or biodegradable materials. Much of said legislation or regulation allows use of two-ply paper bags. In this manner, when a user of the present insert 10 has filled said insert 10 with clippings, said user may simply remove the insert 10 from the associated grass catching bag 37 and place the insert 10 in the designated area for disposal. The clippings need not be moved or otherwise handled. Employing the insert 10 of paper also allows the insert 10 to substantially maintain its width 47 and depth 48 along the length 39 of the insert 10 due to the non-stretching nature of paper. The width 47 and depth 48 of the insert 10 will therefore not be expanded beyond the dimensions of a grass catching bag mouth 49. The ability to remove the insert 10 from the grass catching bag is therefore maintained.

Figure 3:
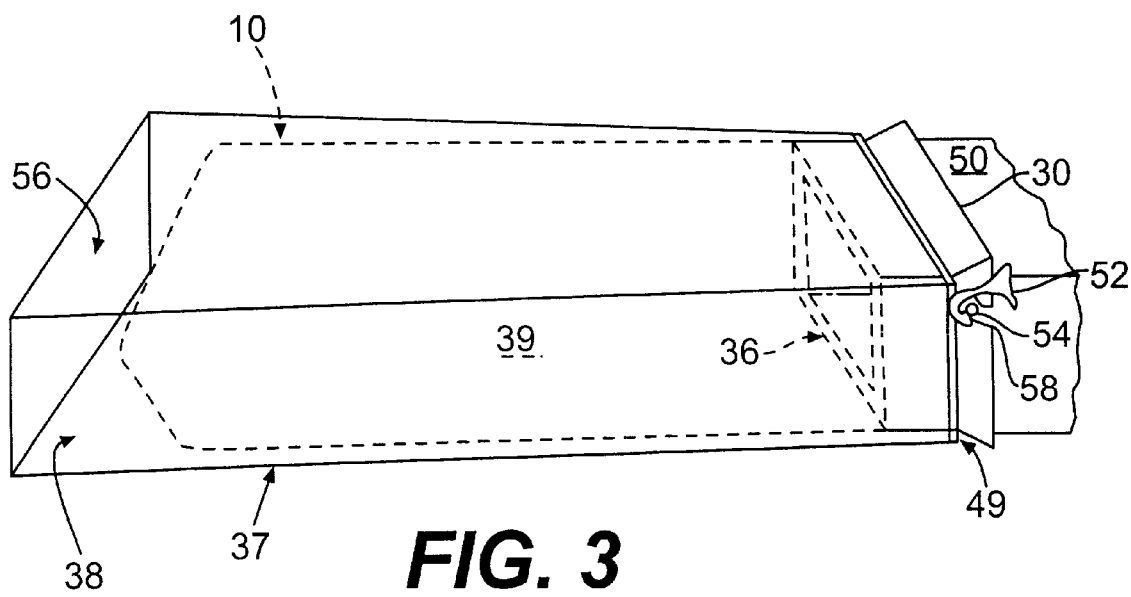
FIG. 3 depicts a substantially schematic perspective view of a grass catcher connected to a discharge chute of a typical lawn mower and having an insert of the present invention positioned therein.

Prior to the present invention, a typical lawn mower ejected grass clippings from a discharge cute 36 into the grass catching bag 37. The grass catching bag 37 comprises the mouth 49 for attachment to the discharge chute 36. The mouth 49 of the grass catching bag 37 typically surrounds an exterior 50 of the discharge chute 36 to allow direct deposit of the clippings into the grass catching bag 37. The typical discharge chute exterior 50 comprises a hardware 52 for allowing a proper securement of the grass catching bag 37 to the discharge chute 36. The grass catching bag will have a complementary hardware 54 for securement to the discharge chute hardware 52. A simple post and slot/hook are depicted in FIG. 3 by way of example only. The present invention will accommodate all types of hardware 52,54. This typical configuration allows for easy placement of the grass catching bag 37 onto the discharge chute 36 and easy removal of the grass catching bag 37 from said discharge chute 36.

Figure 2:
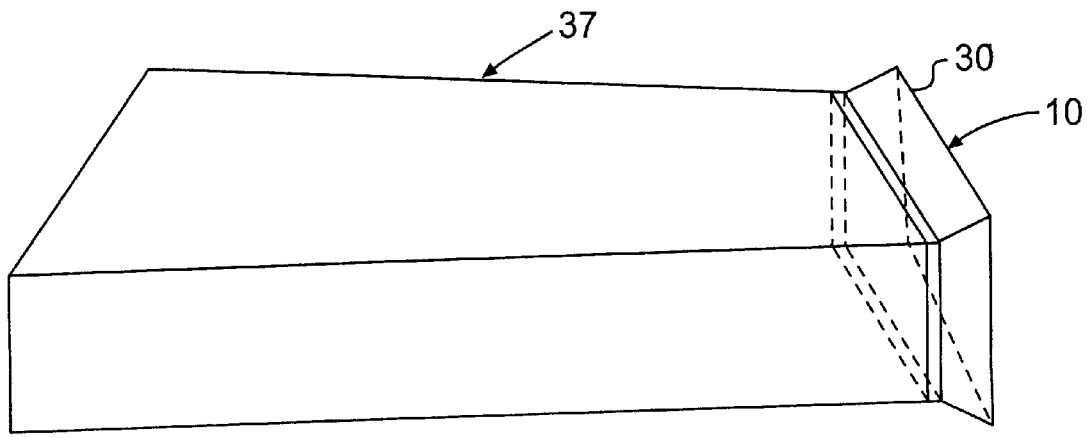
FIG. 2 depicts a substantially schematic perspective view of a typical grass catcher used with a lawn mower having an insert of the present invention deposited therein.

The advantages of the present insert 10 are best enjoyed by placing the insert 10 within the grass catching bag 37 of a lawn mower to be employed. Insertion of the insert 10 into the grass catching bag 37 is accomplished by placing the closed end thereof 28 into the mouth 49 of the grass catching bag and sliding the insert 10 into the grass catching bag 37 until the closed end 28 of the insert has reached a bottom 56 of the grass catching bag 37 as depicted in FIG. 2. If a typical grass catching bag 37 is being employed, the open end 30 of the insert 10 will protrude from the mouth 49 of the grass catching bag 37. To reach this desired characteristic, the length 39 of the present insert 10 is designed to be great enough that the open end 30 of the insert 10 will protrude from the mouth 49 of most grass catching bags 37 in production at the time the insert 10 is manufactured. It is also contemplated that a plurality of different length 39 inserts 10 would accomplish the desired goal of the open end 30 protruding from the grass catching bag 37. However, to reduce costs of production and inventory, a single length 39 is preferred.

Once the insert 10 is in the grass catching bag 37, the mouth 49 thereof may be placed over the exterior 50 of the discharge chute 36 as depicted in FIG. 3. Although tough enough to resist puncture, most two-ply paper inserts 10 will allow the user to place small tears 58 in the insert proximate the open end 30 thereof. Said small tears 58 allow the insert 10 to accommodate the hardware 52,54 of the discharge chute 36 and the grass catcher 37. Once the small tears 58 of the insert 10 has allowed the discharge chute hardware 52 to interface with the grass catcher bag hardware 54, the grass catcher bag 37 may be secured to the discharge chute 36 in the same manner as it is accomplished without use of the insert 10. The interface between the discharge chute 36 and the grass catcher bag 37 provides a friction, or pinching, grasp of the insert 10 therebetween.

Once use of the lawn mower employing an insert 10 of the present invention has filled the insert 10, the grass catcher bag 37 and the insert 10 are removed from the discharge chute 36 as a unit. The insert 10 is then removed from the grass catcher bag 37. Because the insert 10 may otherwise tend to expand beyond the size of the grass catcher bag mouth 49 when it is filled with clippings, the width 47 and the depth 48 of the insert 10 should be sized no larger than corresponding dimensions of the mouth 49 of the grass catching bag 37. To reduce production costs, all of the inserts 10 may be produced to have the same width 47 and depth 48. The insert 10 could then be gathered in some areas to fit over a smaller discharge chute 36 or expanded (as described below) to fit over a larger discharge chute 36.

Figure 4A:
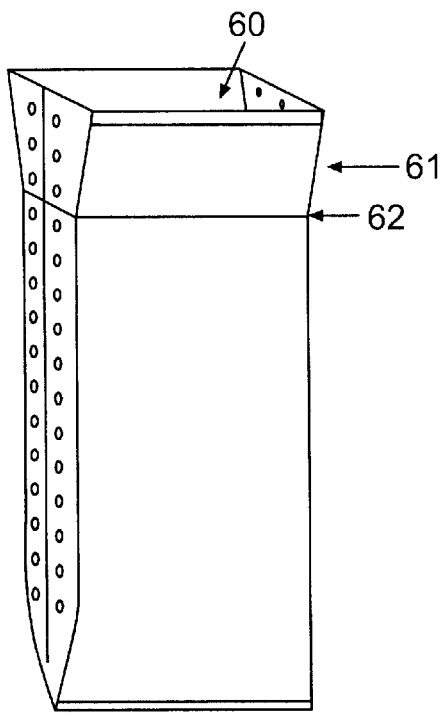
FIG. 4A depicts a substantially schematic perspective view of an insert of the present invention having an enlargable open end in an enlarged configuration.
Figure 4B:
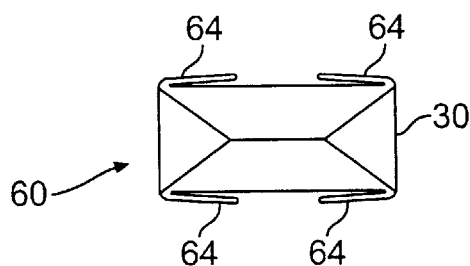
FIG. 4B depicts a substantially schematic top view of an insert of the present invention having an enlargable open end in a folded configuration.

In an alternate embodiment, the open end 30 may comprise an enlargable open end 60 to allow expansion of said open end 60 to fit a larger discharge chute 36. In this embodiment, depicted in FIGS. 4A and 4B, the insert 10 comprises an enlargable section 61 having a larger width 47 and/or depth 48 than other portions of the insert extending from a transition point 62 along the length 39 to said enlargable open end 60. The enlargable open end 60 could be accomplished by placing folds 64 (as depicted in FIG. 4B) on any of the top 16, bottom 18, first side 12 or second side 14 of the insert 10. Preferably, the folds are located at at least one of the insert top first edge 20, the insert bottom first edge 22, the insert top second edge 24 and the insert bottom second edge 26. FIG. 4B depicts the enlargable open end 60 of the present invention in the unenlarged position and comprising a fold 64 at each of the insert top first edge 20, the insert bottom first edge 22, the insert top second edge 24 and the insert bottom second edge 26. The folds 64 allow the enlargable open end 60 to present an unenlarged open end when the folds are left folded (as depicted in FIG. 4B), yet present an enlarged end when the folds are unfolded (as depicted in FIG. 4A). When applying the enlargable open end 60 to an associated discharge chute 36, the enlargable open end 60 cannot expand beyond the width 47 or depth 48 of the grass catching bag mouth 49 which holds said enlargable open end 60 to the discharge cute 36. Therefore, the clippings ejected into the insert 10 will not expand said insert 10 beyond the width 47 or the depth 48 of the grass catching bag mouth 49. The enlargable open end 60 will not prevent the insert 10 from being easily removed from the grass catching bag 37.

The above described insert 10 allows one employing a lawn mower having a grass catching bag 37 to catch all clippings ejected from a mower in said insert 10 and quickly and easily remove said grass clippings from the grass catching bag 37 without contact with, or substantial exposure to, the clippings. This relieves problems typically experienced by persons having allergies related to vegetation typically found in lawns. Additionally, the present insert 10 allows a user to remove the insert 10 from the grass catching bag 37 and simply place the filled insert 10 in the area designated by law. The user need not empty the clippings from the grass catching bag 37 into a government approved bag to accomplish proper and legal disposal.

Figure 5:
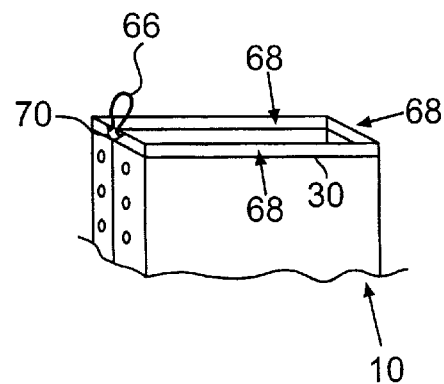
FIG. 5 depicts a preferred drawstring closure of an insert of the present invention.

Closure of the open end 30 of the insert 10 may be accomplished by simple stapling shut of the open end 30. Preferably, however, the open end 30 comprises a draw string 66 for closing the insert 10 depicted in FIG. 5. To accomplish a draw string closure, a drawstring enclosure 68 is placed at the open end 30 of the insert 10 through which the draw string 66 is run. It is preferred that the enclosure is formed by folding the open end 30 over onto the insert 10. However, any manner known in the art of providing a drawstring to a bag or other container may accomplish the drawstring of the present invention. The drawstring is accessed through an access aperture 70 in the enclosure 68 through which a user grasps and pulls the drawstring 66 to close the open end 30. It is also contemplated that other closure attachments may be employed to seal the insert 10. For example, a bendable metal band (not depicted) could be attached to the insert 10 along either the insert top 16 or bottom 18 and have elongated portions extending beyond the top and bottom first edges 20,22 and second edges 24,26. Upon folding closed the insert open end 30, elongated portions of the metal band may be folded around the folded portions of the insert 10 to ensure that the insert 10 does not re-open. Alternatively, an adhesive strip (not depicted) protected by a removable dirt protective strip until ready for use, may be placed at the open end 30 of the insert 10 to allow for proper sealing once the open end 30 has bee n folded into a closed configuration.

To effectuate proper closure of the open end 30, enough of the length 39 of the insert 10 must be left unfilled to allow the top 16, bottom 18, first side 12 and second side 14 of the insert to gather over the clippings in the insert 10 and seal said insert 10. Consequently, it is preferred that the insert 10 is longer than the associated grass clipping bag 37 to provide for the extra length 39. In an alternative embodiment, the insert 10 could comprise a length 39 which is significantly longer than the grass catching bag 37 to present un-used portions of the insert 10 after the insert 10 ha s been removed from the grass catching bag 37. Said un-used portions allow for extra debris from other activities such as weeding to be placed into the insert 10 prior to sealing of said insert 10.

The foregoing has presented an insert which will allow any person owning a lawn mower having a grass catching bag 37 thereon to place a governmental pre-approved disposable insert 10 into the grass catching bag 37. Once the insert 10 is in the grass catching bag 37, the user may cut a lawn or other terrain until the insert 10 is full. Then the user need only remove the grass catching bag 37 from the discharge chute 36 and slide the insert 10 out from the mouth 49 of the grass catching bag 37. The insert 10 then need only be closed and placed in the governmental approved area. Because of the size and adaptable nature of the insert 10 provided by the enlargable open end 60, a single insert 10 may be employed with almost any typical grass catching bag 37. Costs of the insert are thereby substantially reduced while providing all the conveniences desired by one using the present insert 10.

The foregoing specification describes only the preferred embodiment of the invention as shown. Other embodiments besides those presented may be articulated as well. The terms and expressions therefore serve only to describe the invention by example only and not to limit the invention. It is expected that others will perceive differences which while differing from the foregoing, do not depart from the spirit and scope of the invention herein described and claimed.

I claim:

1. A grass catching insert bag, configured to be placed in a grass catching container having a mouth defining a mouth width and a mouth depth and adapted to be removably attached to a lawn mower having a discharge chute defining a discharge width and a discharge depth, the grass catching insert bag comprising:

a first side panel, a second side panel, a top panel and a bottom panel forming an enclosure having a closed end and an opening and defining a width, a depth, and a length, the width and the depth increase at a uniform rate from said closed end to said opening;

said grass catching insert bag being configured such that when full of debris, said width and said depth of said insert bag are smaller at all points along said length from said opening to said closed end than said mouth width and said mouth depth respectively of said grass catching container, such that said grass catching insert bag is adapted to be removable from said grass catching container through said mouth of said grass catching container;

a transition point on said grass catching insert bag at said opening, an enlarged section, extending from said opening with a width and a depth that increases at a greater rate than the width and the depth of the enclosure; said enlarged section defining a greater perimeter, width and depth than a perimeter, a width and a depth of said opening, said enlarged section being configured such that said enlarged section at an end thereof is greater in width and depth than said discharge width and discharge depth respectively to be adapted to substantially surround said discharge chute.

2. The grass catching insert bag of claim 1, wherein said grass catching insert bag is adapted to be selectively held to said discharge chute solely by being pinched between said discharge chute and said grass catching container when said grass catching container is attached to said discharge chute.

3. The grass catching insert bag of claim 1, wherein said insert bag is constructed of a two-ply paper.

4. An improved method of providing a disposable insert bag for a lawn mower having a discharge chute defining a chute width and a chute depth, and grass catcher having a mouth defining a mouth depth and a mouth width, said method comprising the steps of:

forming said bag with a first side panel, a second side panel, a top panel and a bottom panel forming an enclosure having a closed end and an opening and defining a width, a depth, and a length, the width and the depth increase at a uniform rate from said closed end to said opening;

configuring said insert bag such that when full of debris, said width and said depth of said insert bag are smaller at all points along said length from said opening to said closed end than said mouth width and said mouth depth respectively of said grass catcher;

providing on said insert bag at said opening, at least one enlarged section extending from a transition point at said opening; the enlarged section having a width and a depth that increases at a greater rate than the width and the depth of the enclosure;

configuring said enlarged section to define a greater perimeter, width and depth than a perimeter, width and depth of said opening;

configuring said enlarged section to define at an end thereof a greater width and depth than said chute width and chute depth respectively;

inserting said insert bag into said grass catcher through said mouth;

placing said enlarged section around said discharge chute;

attaching said grass catcher to said discharge chute; and removing said insert bag from said grass catcher through said mouth of said grass catcher when said insert bag is filled.

5. The method of claim 4, wherein said step of attaching said grass catcher to said discharge chute includes the step of pinching between said insert bag between said discharge chute and said grass catcher.

* * * * *